US010571054B2

(12) United States Patent
Cheng-Sheng (10) Patent No.: US 10,571,054 B2
(45) Date of Patent: Feb. 25, 2020

(54) THREE PIECE PIPE COUPLING

(71) Applicant: Tyco Fire Products LP, Lansdale, PA (US)

(72) Inventor: Hsu Cheng-Sheng, Taipei (TW)

(73) Assignee: Tyco Fire Products LP, Lansdale, PA (US)

( * ) Notice: Subject to any disclaimer, the term of this patent is extended or adjusted under 35 U.S.C. 154(b) by 810 days.

(21) Appl. No.: 14/772,869

(22) PCT Filed: Mar. 6, 2014

(86) PCT No.: PCT/EP2014/054377
§ 371 (c)(1),
(2) Date: Sep. 4, 2015

(87) PCT Pub. No.: WO2014/135649
PCT Pub. Date: Sep. 12, 2014

(65) Prior Publication Data
US 2016/0010771 A1    Jan. 14, 2016

Related U.S. Application Data

(60) Provisional application No. 61/774,409, filed on Mar. 7, 2013.

(51) Int. Cl.
*F16L 17/04* (2006.01)
*F16L 23/08* (2006.01)
*F16L 21/00* (2006.01)

(52) U.S. Cl.
CPC .............. *F16L 17/04* (2013.01); *F16L 21/005* (2013.01); *F16L 23/08* (2013.01)

(58) Field of Classification Search
CPC ......... F16L 17/04; F16L 17/035; F16L 17/06; F16L 23/04; F16L 23/08; F16L 21/002; F16L 21/005
See application file for complete search history.

(56) References Cited

U.S. PATENT DOCUMENTS 2,752,173 A * 6/1956 Krooss ................... F16L 17/04
285/232
4,408,788 A * 10/1983 Beukema ................ F16L 23/08
285/112
(Continued)

FOREIGN PATENT DOCUMENTS

CA         2710891 A1 *  2/2011  .............. F16L 17/04
DE         40 09 403        9/1991
(Continued)

OTHER PUBLICATIONS

International Search Report and Written Opinion for International Application No. PCT/EP2014/054377, dated May 27, 2014, 9 pages.

*Primary Examiner* — David Bochna
*Assistant Examiner* — James A Linford
(74) *Attorney, Agent, or Firm* — Foley & Lardner LLP (57) ABSTRACT

A preassembled pipe coupling and method for joining pipe segments in an end-to-end relationship. The coupling (100) includes three identical housing segments (110) joined end to end. Each housing segment (110) includes a pipe engagement surface defining a radius of curvature. The radii of curvature of the three housing segments (110) are identical. The third housing segment is connected to the first and second housing segments to define a first configuration and a second configuration of the coupling, in which the radii of curvatures are the same in the first and second configurations. In the first configuration, the three housing segments (110) are radially located about an annular gasket (400) to permit insertion of the pipe segment into the gasket (400). In the second configuration, the three housing segments are radially located about the annular gasket such that the gasket is compressed to form a fluid tight seal and the pipe (Continued)

engagement surfaces engage the outer surface of the pipe segment.

12 Claims, 9 Drawing Sheets

(56) References Cited

U.S. PATENT DOCUMENTS

| | | | | |
|---|---|---|---|---|
| 4,471,979 A | * | 9/1984 | Gibb | F16L 17/04 285/112 |
| 4,702,499 A | * | 10/1987 | deRaymond | F16L 17/04 285/112 |
| 4,702,500 A | * | 10/1987 | Thau, Jr. | F16J 15/065 277/607 |
| 5,505,503 A | * | 4/1996 | Boivin | F16L 17/04 285/112 |
| 6,139,069 A | * | 10/2000 | Radzik | F16L 17/04 285/112 |
| 2003/0122377 A1 | * | 7/2003 | Northrop | F16L 23/08 285/363 |
| 2005/0212284 A1 | * | 9/2005 | Dole | B21D 17/04 285/110 |
| 2011/0154646 A1 | * | 6/2011 | Hagiya | F16L 23/08 29/505 |
| 2013/0185919 A1 | * | 7/2013 | Beagen, Jr. | F16L 17/025 29/525.02 |
| 2013/0319568 A1 | * | 12/2013 | Daugherty | F16L 9/147 138/109 |

FOREIGN PATENT DOCUMENTS

| | | | | |
|---|---|---|---|---|
| FR | 618146 | | 3/1927 | |
| FR | 2088824 | | 1/1972 | |
| GB | 305609 A | * | 2/1929 | ............ F16L 23/08 |
| GB | 0 570 913 | | 7/1945 | |
| GB | 1288680 A | * | 9/1972 | ............ F16L 21/022 |
| GB | 2 169 682 | | 7/1986 | |

* cited by examiner

*Fig. 7B*

THREE PIECE PIPE COUPLING

PRIORITY DATA

This application is a 35 U.S.C. § 371 application of International Application No. PCT/EP2014/054377 filed Mar. 6, 2014, which claims the benefit of priority to U.S. Provisional Patent Application No. 61/774,409, filed Mar. 7, 2013, each of which is incorporated by reference in its entirety.

TECHNICAL FIELD

This invention relates generally to pipe fittings and more specifically devices and methods for coupling fluid conveying piping or tubing.

BACKGROUND OF THE INVENTION

Gasketed mechanical couplings are used to connect pipe segments in an end-to-end relationship. Known preassembled mechanical couplings, such as for example those shown in U.S. Pat. No. 4,522,434 include one or more housing segments that are joined by two or more mechanical fasteners, e.g., bolt and nut assemblies; to form opposed end face openings of the coupling into which the pipe segments may be inserted. Each housing segment includes a pair of arcuate surfaces which define a portion of the end face opening for engagement with an outer surface of the pipe segment, such as for example the circumferential groove in standard grooved-end pipe, to prevent axial separation of the pipe segments. In some known couplings, the arcuate surfaces are defined by a radius of curvature that is greater than the radius of curvature defined by the outer surface of the pipe in order that the pipe segment may be inserted or "stabbed" into the coupling preassembly. Once the pipe segment is inserted into the preassembled coupling, the fasteners are tightened such that the housing segments are deformed to conform to the outer surface of the pipe segment to form a close engagement between the arcuate surfaces and the pipe. Accordingly, the radius of curvature of the arcuate surfaces of the housing segment is altered. Alternatively in other known couplings, for example, those shown in U.S. Pat. No. 4,471,979, the housing segments of the coupling are not deformed. Instead, the pipe or tubing to be joined is deformed to conform to and engage the arcuate surfaces of the coupling housing segments.

For coupling preassemblies in which the housing segment is deformed, installation of these known preassembled couplings can be difficult or complex due to the torque requirements in tightening the coupling fasteners to deform the housing segments about the joined pipe segments. The installation can be further complicated depending upon the orientation, location and/or accessibility of the preassembled coupling and its fasteners, which may affect the accessibility of the fasteners.

SUMMARY OF THE INVENTION

A preferred preassembled coupling assembly is provided to address the problems associated with the installation of prior art mechanical couplings for joining two piping segments. In particular, the preferred embodiments of the preassembled coupling provide for an arrangement in which the pipe segments are inserted into the coupling to form an end-to-end relationship, and neither the coupling nor the piping segments require deformation to form a fluid tight seal. The preferred couplings include a multi-segmented and more preferably a three-part housing with two configurations to facilitate formation of the pipe joint. In a first configuration, the housing segments are interconnected and spaced apart to provide sufficient clearance for insertion of the pipe segment into the interior of the housing. In a second configuration, the housing segments are located about the pipe segments to engage the outer surface of the pipe segments and form the fluid tight seal. Although the couplings are preferably configured for joining grooved-end pipe segments, the couplings are suited for joining alternately configured pipe segments.

A preferred embodiment of the preassembled pipe coupling includes a first housing segment with a first pipe engagement surface having a first radius of curvature from a first center of curvature. The first housing segment has a first pair of end pads with the first engagement surface disposed between the first pair of end pads. The coupling includes a second housing segment with a second pipe engagement surface having a second radius of curvature from a second center of curvature. The second housing segment has a second pair of end pads with the second engagement surface disposed between the second pair of end pads. A third housing segment of the coupling includes a third pipe engagement surface having a third radius of curvature from a third center of curvature. The third housing segment has a third pair of end pads with the third engagement surface disposed between the third pair of end pads. For the preferred coupling the first, second and third radii of curvatures are identical.

The coupling includes an annular gasket member that defines a central axis. A first bolt assembly couples one end pad of the first housing segment to one end pad of the second housing segment to define a pivot point about which the first and second pipe engagement surfaces pivot with respect to one another. The coupling also includes a second bolt assembly and a third bolt assembly for locating the first, second, and third pipe engagement surfaces about the gasket member in either one of a first configuration or a second configuration. In the first configuration, the engagement surfaces define an interior space of the coupling for inserting a pipe segment. In the second configuration, the first, second, and third pipe engagement surfaces are located about the gasket member such that the first, second and third pipe engagement surfaces engage the outer surface of the pipe segment and compress the gasket member about the outer surface to form a fluid tight seal. In the first configuration, the first, second, and third centers of curvature of the engagement surfaces are preferably spaced apart; and in the second configuration, the first, second and third centers of curvature are preferably coaxially aligned, the first, second and third radii are the same in each of the first and second configurations.

The second bolt assembly defines a second bolt axis and the third bolt assembly defines a third bolt axis. The second and third bolt assemblies join the first and second housing segments to the third housing segment. The first, second and third bolt assemblies are preferably oriented with respect to one another such that the second and third bolt axes each define an included angle therebetween, preferably an acute angle of about sixty degrees. The second and third bolt assemblies each include a bolt and a nut. The bolt has a bolt head with a threaded shank with the nut disposed on the threaded shank. In the second configuration of the coupling, the first bolt axis extends parallel to a plane passing through the aligned first, second and third centers of curvature. The second and third bolt assemblies are disposed to one side of the plane opposite the first bolt assembly. The bolt heads of the second and third bolt assemblies are disposed between the plane and the nuts of the second and third bolt assemblies.

In another embodiment of the pipe coupling, a housing has three identical housing segments. Each segment has a pair of end pads with an arcuate segment disposed between the end pads. The arcuate segment includes a pair of pipe engagement surfaces extending parallel to one another from one end pad to the other end pad. The housing segment includes an inner surface defining a cavity between the pipe engagement surfaces for housing a portion of an annular pipe gasket. The gasket has an inner surface including a sealing lip circumscribed about a central axis to define an internal diameter of the gasket. Each pipe engagement surface has a radius of curvature from a center of curvature; the radii of curvature of the three housing segments are identical.

The three housing segments are interconnected end pad-to-end pad to house the pipe gasket, with a first housing segment and a second housing segment forming a pivot connection therebetween. The third housing segment is connected to the first and second housing segments to define a first configuration and a second configuration of the coupling, in which the radii of curvatures are the same in the first and second configurations. In the first configuration, the three housing segments are radially located about the annular gasket such that the inner diameter of the gasket is greater than an outer diameter of a pipe segment for receipt of the pipe segment. Moreover, the pipe engagement surfaces are located about the central axis to permit insertion of the pipe segment into the gasket. In the second configuration, the three housing segments are radially located about the annular gasket such that the gasket is compressed and the sealing lip engages a portion of the outer surface of the pipe to form a fluid tight seal. The pipe engagement surfaces are located about the central axis to engage another portion of the outer surface of the pipe segment. The outer diameter of the pipe segment in the second configuration is the same as the outer diameter of the pipe in the first configuration.

A method of forming a pipe joint with a preassembled pipe coupling is provided. The method includes locating three identical housing segments about the pipe gasket in a first configuration such that an internal diameter of the gasket is greater than an outer diameter of a pipe segment for receipt of a pipe segment. The internal diameter is defined by an internal surface of the gasket including a sealing lip circumscribed about a central axis. Each housing segment has an arcuate segment with a pair of end pads disposed about the arcuate segment, the arcuate segment including a pair of pipe engagement surfaces extending parallel to one another from one end pad to the other end pad. The housing segment includes an inner surface defining a cavity between the pipe engagement surfaces for housing a portion of the annular pipe gasket. Each pipe engagement surface has a radius of curvature from a center of curvature, the radii of curvature of the three housing segments are identical. Locating of the three housing segments in the first configuration includes pivoting a first housing segment and a second housing segment away from one another such that the centers of curvature are spaced about the central axis.

The method further includes locating the three housing segments about the pipe gasket in a second configuration such that the pipe gasket is compressed so that the sealing lip engages a portion of the outer surface of the pipe to form a fluid tight seal. The pipe engagement surfaces are located about the central axis so as to engage another portion of the outer surface of the pipe segment. The method includes maintaining the radii of curvature of the engagement surfaces and the outer diameter of the pipe segment to be the same in each of the first and second configurations.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

DETAILED DESCRIPTION

Figure 1A:
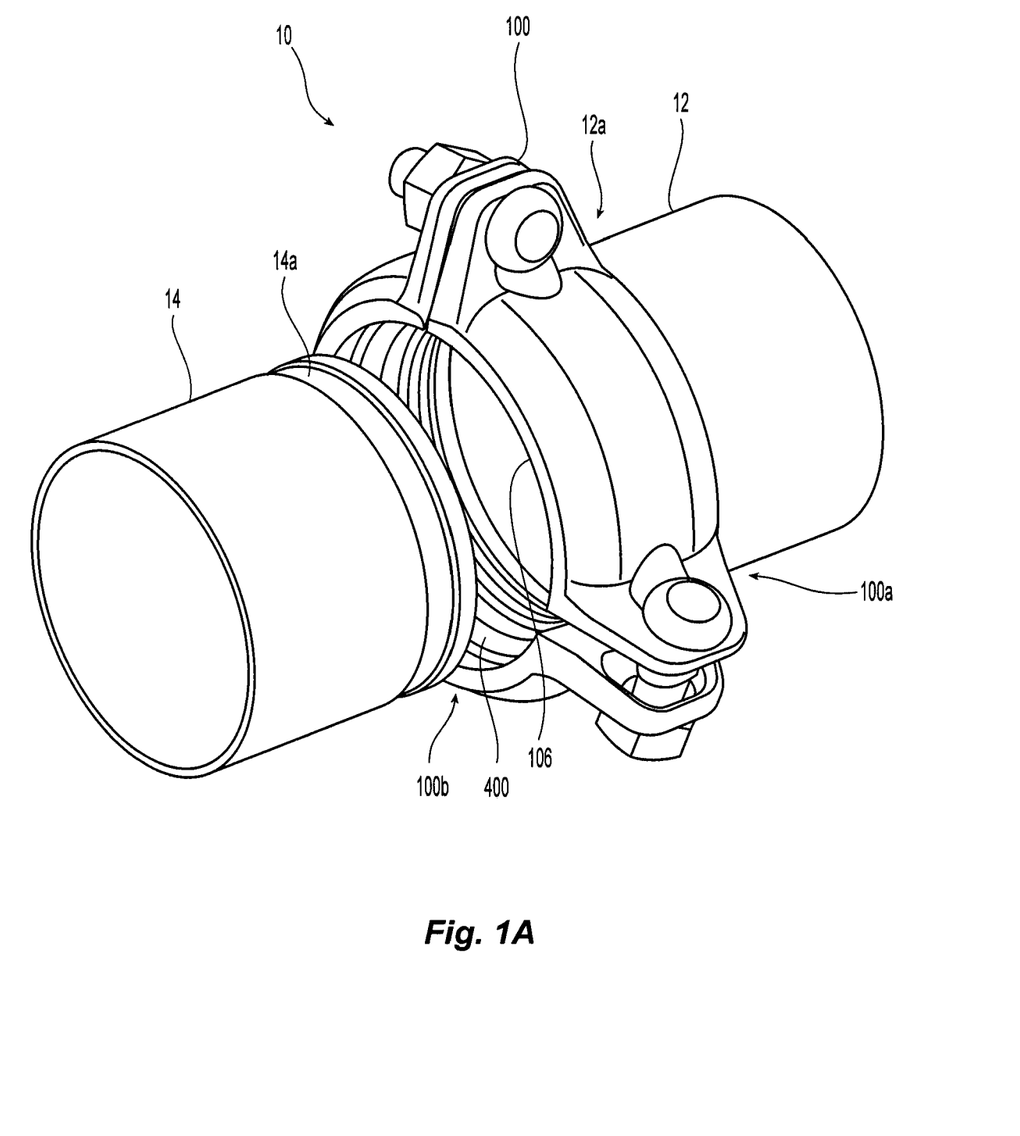
FIG. 1A is an isometric view of a preferred preassembled coupling in an open configuration with pipe segments being inserted to form a pipe joint.
Figure 1B:
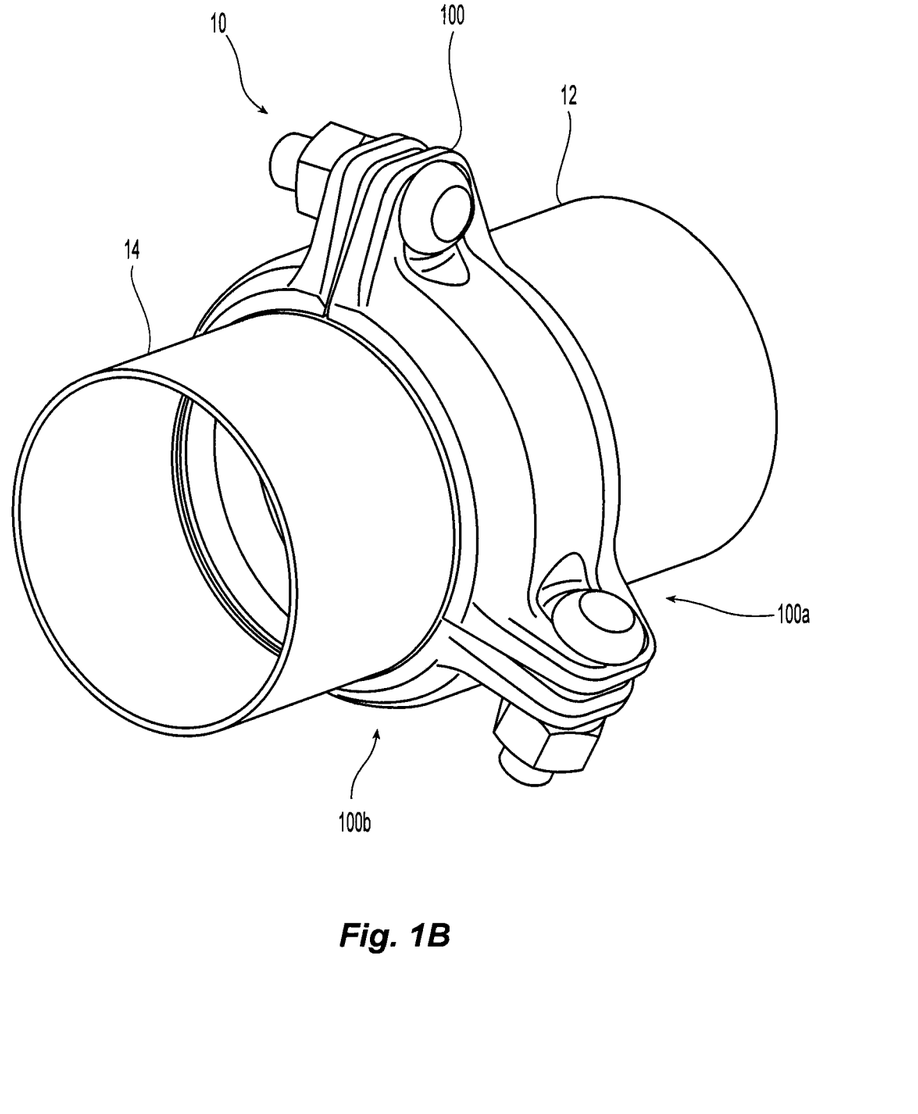
FIG. 1B is an isometric view of the preferred coupling of FIG. 1A in a closed configuration in the formation of the pipe joint.

Shown in FIG. 1A and FIG. 1B is the formation of a pipe joint 10 between first and second pipe segments 12, 14 using a preferred preassembled coupling 100. The coupling 100 includes a plurality of interior groove engagement surfaces for engaging the outer surface of the pipe segments 12, 14 and a gasket member 400 for forming a fluid tight seal about the pipe joint 10. FIG. 1A shows the coupling 100 in an open configuration with a first pipe segment 12 inserted into first receiving side 100a of the preferred coupling 100 with a second pipe segment 14 in position for insertion into a second receiving side 100b of the coupling 100. In FIG. 1B, each of the first and second pipe segments 12, 14 are inserted within the coupling 100 in an end-to-end relationship and the coupling is placed into a closed configuration. In the closed configuration, the interior engagement surfaces of the coupling 100 engage the outer surface of the pipe segments 12, 14 to compress the gasket member (not shown) to form a fluid tight seal about the pipe segments 12, 14. Accordingly, the preferred coupling 100 provides a preassembled connection fitting having a first configuration for locating the two pipe segments 12, 14 in an end-to-end relationship and a second configuration for forming a fluid tight seal between the pipe segments in the end-to-end relationship.

The coupling 100 is preferably configured for joining grooved-end pipe segments. For example, as shown in FIG. 1A, the pipe segment 14 includes a circumferential groove 14a and pipe segment 12 includes a corresponding circumferential groove 12a. For a preferred embodiment of the coupling 100, the interior engagement surfaces 106 are configured to engage the circumferential grooves 12a, 14a to prevent axial separation of the pipe segments, as seen for example in FIG. 5B. The interior engagement surfaces 106 of the coupling 100 may engage alternatively configured pipe segment ends. For example, the coupling 100 may be used to join shoulder pipe as seen for example in FIGS. 7A and 7B. Further in the alternative, the interior pipe engagement surfaces may define a geometry to engage plain end pipe in a frictional and/or mechanical engagement to prevent axial separation. For example, the interior engagement surface 106 may define mechanical teeth for gripping plain end pipe (not shown).

Figure 2A:
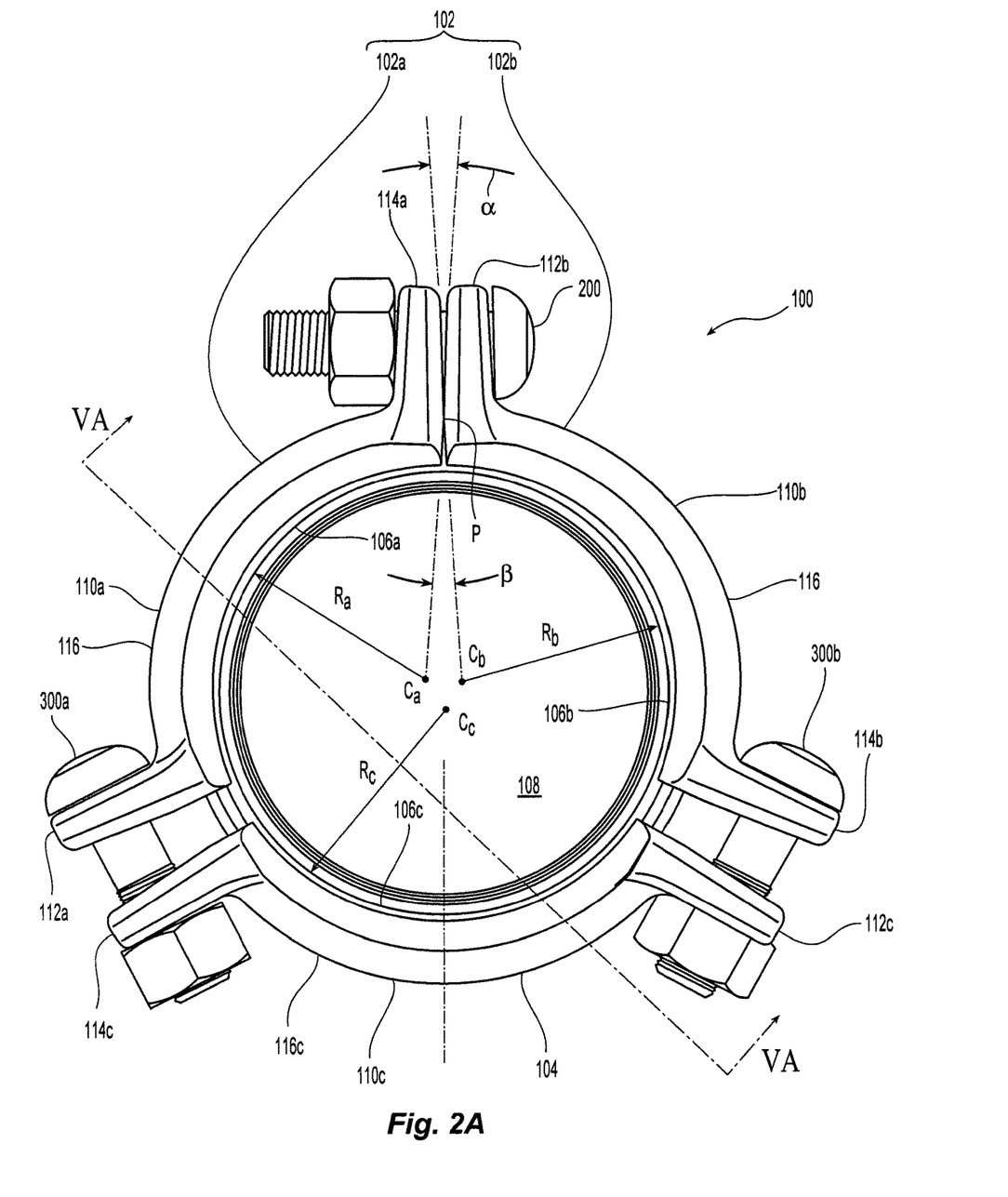
FIG. 2A is a receiving end view of the preassembled coupling of FIG. 1 in an open configuration.

Shown in FIG. 2A is the preferred coupling assembly 100 in the open configuration viewed from the pipe receiving end face 100b. Each receiving end 100a (not shown), 100b of the coupling assembly 100 includes a plurality of pipe engagement surfaces 106 for preferably engaging an outer surface of a pipe segment 12, 14 received in the receiving end 100a, 100b in order to hold the pipe segments 12, 14 in an end-to-end relationship to form the pipe joint 10. In a preferred embodiment, each receiving end 100a, 100b includes a first pipe engagement surface 106a and a second engagement surface 106b configured to pivot with respect to one another. Each receiving end 100a, 100b preferably includes a third engagement surface 106c which cooperates with the other engagement surfaces 106a, 106b to define a substantially closed form interior space 108 of the preassembled coupling 100.

The coupling 100 further preferably provides for a preferred arrangement of components to locate and space the third engagement surface 106c relative to the first and second groove engagement surfaces 106a, 106b in order to form and seal the pipe joint 10. Alternatively or in addition to, the preferred arrangement of components tension the assembly 100 so as to pivot the first and second engagement surfaces 106a, 106b with respect to one another to locate and space the engagement surfaces 106a, 106b, 106c with respect to one another. Accordingly, in the installation or operation of the preassembled coupling 100, the coupling preferably has a first state or configuration to maximize the size or area defined by the interior space 108 in the open configuration of the coupling 100 to allow insertion of the pipe segment 12, 14 into the interior space 108. The coupling 100 also preferably has a second state or configuration to minimize the size or area of the interior space 108 in the closed configuration of the coupling 100 to enclose the coupling 100 about the pipe segment to form a preferably fluid tight seal about the pipe joint 10.

With reference to FIG. 2A, a preferred embodiment of the coupling assembly 100 includes a plurality of identical housing segments 110, each of which defines or includes the arcuate pipe engagement surfaces 106. The preferred embodiment of the coupling 100 includes three housing segments 110a, 110b, 110c which are interconnected to one another in an end-to-end relationship. Each of the preferred housing segments 110 have a first end pad 112 and a second end pad 114 with a housing body 116, and more preferably an arcuate housing body, extending between the first and second end pads 112, 114. The housing body 116 of each segment 110 defines a portion of the receiving end face 100a, 100b of the coupling 100 and further provides the arcuate engagement surfaces 106 for engaging the outer surface of an inserted pipe segment.

Each arcuate pipe engagement surface 106 defines a radius of curvature R from a center of curvature C which is about equal to the radius of curvature defined by the outer surface of the pipe segments 12, 14 to be inserted into coupling 100. More preferably, the radius R is about equal to the radius defined by the nominal groove diameter of a grooved-end pipe segment to be inserted into the coupling 100. For the preferred embodiment, the radius of curvature R may have some variability with the radius of curvature defined by the circumferential grooves 12a, 14a or other portion of the pipe segments 12, 14 provided that the engagement surfaces 106 of the housing segment 110 can properly engage the outer surface of the pipe segments 12, 14 to form the pipe joint as described herein. For the preferred embodiment shown in FIG. 2A, each of the three, preferably identical, housing segments 110a, 110b, 110c and their corresponding arcuate surfaces 106a, 106b, 106c define a radius of curvature Ra, Rb, Rc from corresponding centers Ca, Cb, Cc, in which the radii are preferably equal to one another for engaging a nominally circular pipe segment and more preferably engaging its circumferential groove.

For the preferred assembly 100 having three identical housing segments 110a, 110b, 110c, the arcuate surfaces 106a, 106b, 106c are preferably continuous over the arc length of the housing segment 110. Thus, the arcuate surfaces 106a, 106b, 106c preferably extend continuously 120 degrees about the center of curvature Ca, Cb, Cc. Alternatively, the arcuate surfaces 106a, 106b, 106c may be discontinuous or segmented over the length of the housing segments 110a, 110b, 110c provided each segment defines the same radius of curvature over the housing segment from the common center of curvature.

As previously described, the radial spacing of the first, second and third arcuate surfaces 106a, 106b, 106c is maximized in the open configuration of the coupling 100 for receipt of a pipe segment. Because the arcuate surfaces 106a, 106b, 106c preferably have an equal or common radius of curvature Ra, Rb, Rc, their centers of curvature Ca, Cb, Cc are correspondingly spaced apart (as graphically shown in FIG. 2A for illustrative purposes). The radial spacing of the first, second and third arcuate surfaces 106a, 106b, 106c is minimized in the closed configuration of the coupling 100 for engagement with and about the circumferential grooves 12a, 14a of pipe segments 12, 14. In the closed configuration, the centers of curvature Ca, Cb, Cc are substantially coaxially aligned at C (as graphically shown in FIG. 2B) with the central axis defined by the circumferential groove or pipe segment. With the radii of curvatures Ra, Ra, Rc being constant or remaining the same in each of the open and closed configurations of the preferred coupling 100, there is no deformation in the housing segments 110a, 110b, 110c in the transition from the open to the closed configuration of the preferred preassembly 100. Moreover, the preferred joint assembly is formed without deformation of the pipe segments 12, 14 such that they retain their same outer diameter in each of the open and closed configurations of the coupling 100.

In the preferred assembly 100, the housing segments 110 are joined end pad 112 to end pad 114. Each of the first and second end pads 112, 114 includes a through bore 118 for receiving a bolt assembly to join the housing segments 110a, 110b together. The preferred coupling 100 includes the first housing segment 110a coupled to the second housing segment 110b by a first bolt assembly 200 and more preferably by a gap setting bolt assembly 200 which permits the housing segments 110a, 110b and their arcuate surfaces 106a, 106b to pivot relative to one another. The first and second end pads 112c, 114c of the third housing segment 110c are joined respectively to the second end pad 114b of the second housing segment 110b and the first end pad 112a of the first housing segment 110a. Preferably extending through each of the joined end pad pairs 112c, 114b, 114c, 112a is a bolt assembly 300a, 300b, which locates and spaces the third arcuate surface 106c with respect to the first and second arcuate surfaces 106a, 106b and further preferably applies a force to pivot the first and second arcuate surfaces 106a, 106b with respect to one another.

In the open configuration of the preassembled coupling 100 of FIG. 2A, the gap setting bolt assembly 200 defines a set or fixed gap or range of separation between the second end pad 114a of the first housing segment and the first end pad 112b of the second housing segment. More preferably gap setting bolt assembly 200 defines the outer angular range α and internal angular range β, each of which defines an included angle about a common pivot point P formed between and along the first and second end pads 114a, 112b. In the open configuration of FIG. 2A, the first and second housing segments 110a, 110b are pivoted away from one another such that the outer angular range α is minimized and the internal angular range is maximized. In the closed configuration of FIG. 2A, the first and second housing segments 110a, 110b are pivoted toward one another such that the outer angular range α is maximized and the internal angular range β is minimized.

In one preferred aspect of the preassembled coupling assembly 100, the pivot between the first and second housing segments 110a, 110b is controlled by the second and third bolt assemblies 300a, 300b. In the open configuration, the bolts 300a, 300b are arranged so as to maximize the respective gaps or spacing between the end pads 112a, 114c of the first and third housing segments 110a, 110c and between the end pads 112c, 114b of the second and third housing segments 110b, 110c. The separation of the end pads 112a, 114c, 112c, 114b by each of the bolt assemblies 300a, 300b further preferably causes the first and second housing segments 110a, 110b into contact at their joined end pads 114a, 112b to define the pivot point P such that the housing segments 110a, 110b pivot away from one another about the pivot point thereby minimizing the outside radial angle α and maximizing the internal radial angle β.

To define the closed configuration of the preferred coupling 100, the bolt assemblies 300a, 300b are tightened so as to bring the end pads 112c, 114c of the third housing segment 110c into contact with the corresponding end pads 112a, 114b of the first and second housing segments 110a, 110b. Continued tightening of the bolt assemblies 300a, 300b in the preferred assembly 100 causes the first and second housing segments 110a, 110b to pivot toward one another about the pivot point P thereby maximizing the outside radial angle $\alpha_{MAX}$ and minimizing the internal radial angle $\beta_{MIN}$ as seen, for example, in the closed configuration of FIG. 2B in which the first and second housing segments 110a, 110b are secured so as not to pivot with respect to one another.

Figure 2B:
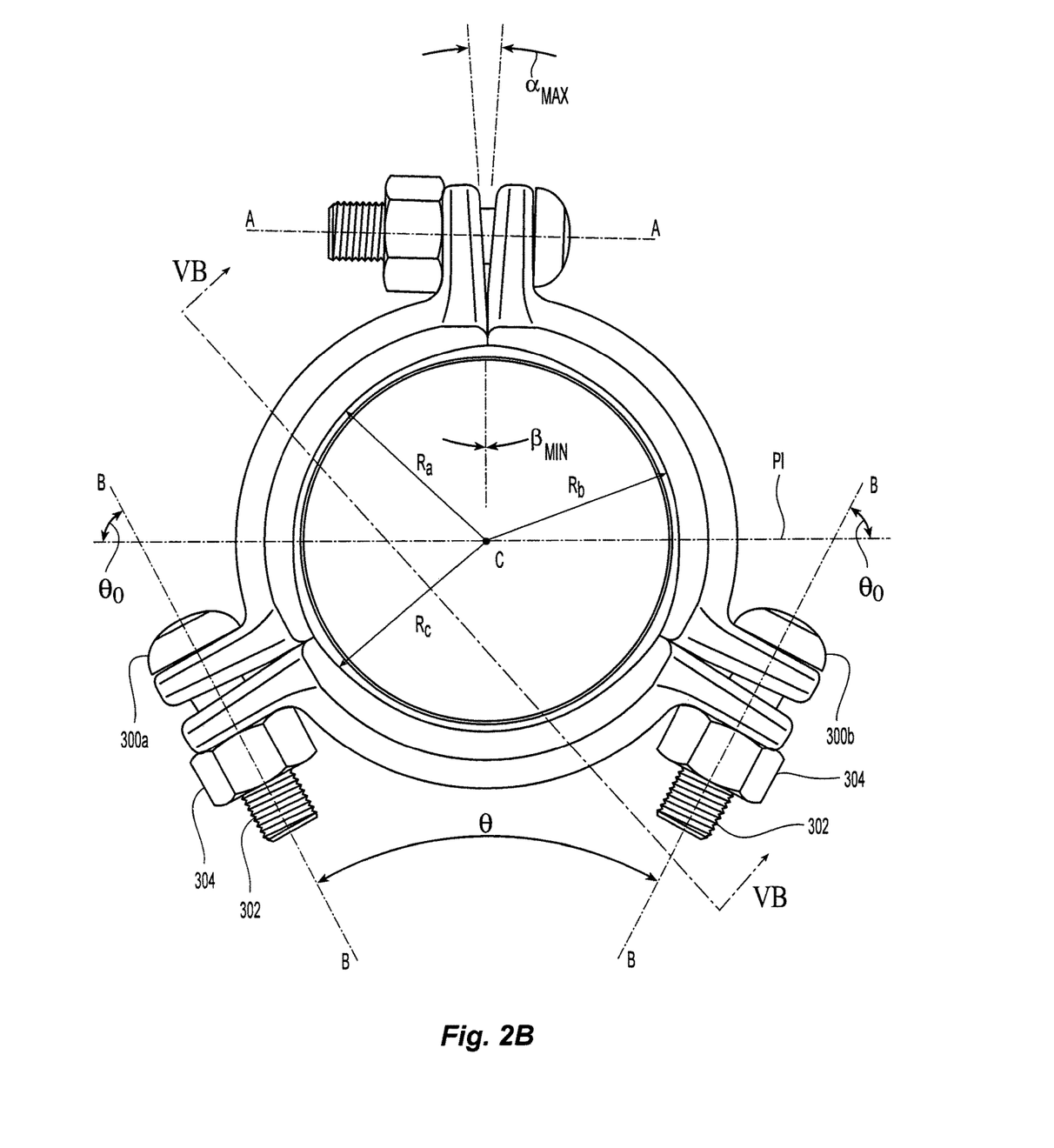
FIG. 2B is another receiving end view of the preassembled coupling of FIG. 1 in a closed configuration.

Referring to FIG. 2B, the bolt assemblies 300 preferably include a bolt portion 302 and nut portion 304. The bolt assemblies are preferably off-the-shelf fasteners. Alternatively, the bolt portion 302 can include an external geometry to prevent the bolt from spinning within the bore 18 of the end pads 112, 114. The preassembled coupling 100 and its end pads 112, 114 are preferably oriented about the pipe joint 10 such that the end pads 112, 114 angle the bolt assemblies 300a, 300b with respect to a plane P1 extending parallel to the gap setting bolt axis A-A such that the nuts are located beneath the plane P1 and the bolt assemblies 300a, 300b are angled toward one another to define an included angle θ preferably of about 60 degrees between the bolt axes of the bolt assemblies 300. As used herein, the term "about" is understood as within a range of normal tolerance in the art, for example within 2 standard deviations of the mean. "About" can be understood as within 15%, 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The location and orientation of the bolt assemblies 300a, 300b can facilitate their installation and adjustment by making the nuts easy to access and adjust relative to the pipe segments 12, 14 for the coupling installer. In particular, the orientation and location of the bolt assemblies and in particular the nuts 304 make it easier for an overhead installation by positioning the nuts 304 beneath the plane P and by placing them in close proximity to one another due to the preferred angular orientation between the bolt axes.

Figure 3A:
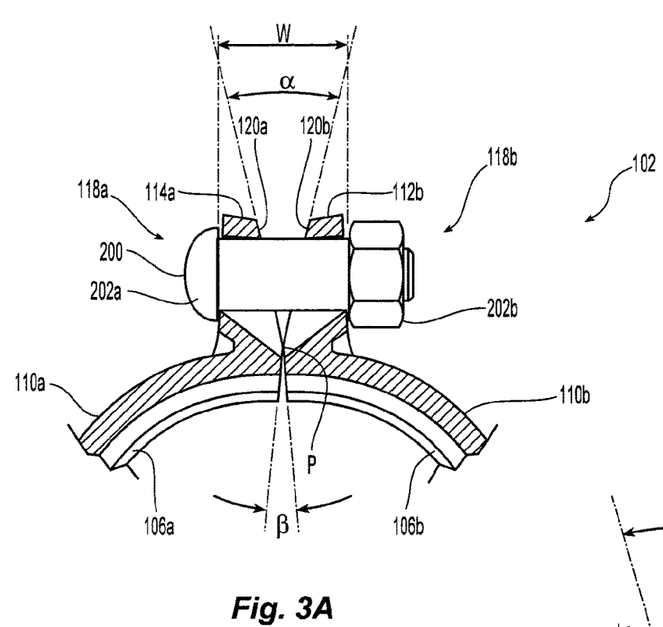
FIGS. 3A-3C are detailed cross-sectional views of various embodiments of the coupling of FIG. 1.

Shown in FIG. 3A is a cross-sectional detailed view of the preferred pivoted connection 102 between the first and second housing segments 110a, 110b. The first and second end pads 112, 114 for each housing segment 110 of the coupling are similarly configured, having through bores 118 for receipt of either one of the gap setting bolt 200 or the second and third bolt assemblies 300. The through bores 118 and bolt assemblies 200, 300 are preferably configured so as to minimize or eliminate spinning or rotation of the bolt assemblies 200, 300 within the bore 118. For example, the through bore 118 can have a non-circular geometry, such as for example oval, and the bolt of the bolt assembly can have a corresponding outer geometry to provide for an engagement that minimizes or eliminates relative rotation. An exemplary end pad bore and bolt geometry is shown and described with respect to FIG. 6C of U.S. Patent Application Publication No. 2012/0256418.

For each of the preferred housing segments 110, each of the end pads 112, 114 include or define a contact surface 120 which extends from the peripheral edge of the end pad toward the arcuate surface 106. As seen in the detailed view of FIG. 3A, the contact surface 120a of the first housing segment 110a faces the contact surface 120b of the second housing segment 110b in the preferred preassembled arrangement. The preferred gap setting bolt 200 defines a gap W in which the joined end pads are held in proximity to one another. More preferably, the end pads 114a, 112b are configured and joined together such that their contact surfaces 120a, 120b contact one another at a pivot point P so as to define the included outer and inner radial angles α, β over which the housing segments 110a, 110b pivot with respect to one another.

Figure 4A:
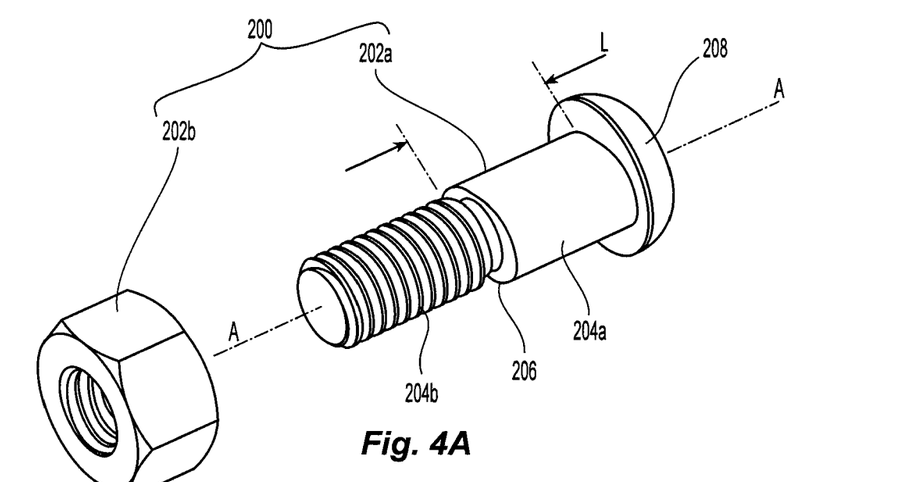
FIG. 4A is an exploded view of the gap setting bolt used in the detailed view of FIG. 3A.
Figure 4B:
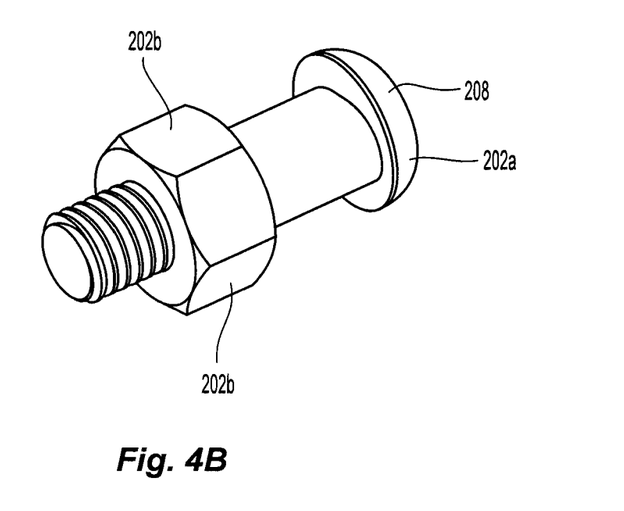
FIG. 4B is an isometric view of the gap setting bolt of FIG. 4A.

A preferred gap setting bolt assembly 200 is shown in FIGS. 4A and 4B. The bolt assembly preferably includes a shank portion 202a and a nut portion 202b. The shank portion 202a defines a shank axis A-A and preferably includes an upper shank portion 204a and a lower externally threaded shank portion 204b for threaded engagement with the internal nut portion 202b using a suitable thread specification, for example, those used in known grooved coupling assemblies, i.e., ½"-13UNC-28. The upper shank portion 204a preferably defines an outer or peripheral geometry for corresponding engagement with the through bore 118 of the end pads 112, 114 such that the bolt assembly 200 will not spin within the through bore. The upper shank portion 204a further preferably defines an axial length L which is sufficient to extend through the coupled through bores 118a, 118b in the closed configuration of the coupling 100. Preferably, the axial length L is about equal to the maximum thickness of two end pads 112, 114 in contact face-to-contact face 120 engagement. The axial length of the upper shank portion 204a is preferably defined by spacing between a shoulder 206 and an enlarged bolt head 208 of the shank portion 204. The shoulder 206 defines a surface transition between the upper and lower shank portions 204a, 204b and is more preferably angled with respect to the bolt axis A-A. The shoulder 206 presents a limit or obstruction to the nut portion 202b and its threaded engagement so as ensure that the assembly 200 provides for the desired gap W over which the housing segments 110a, 110b may pivot with respect to one another.

Figure 3B:
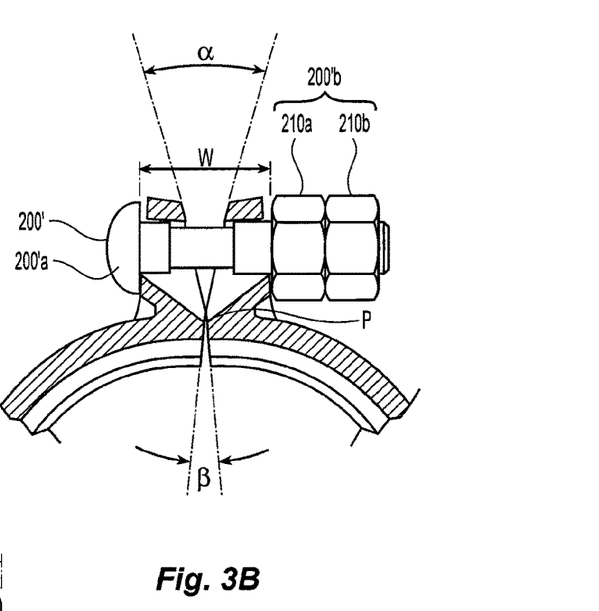
Figure 3C:
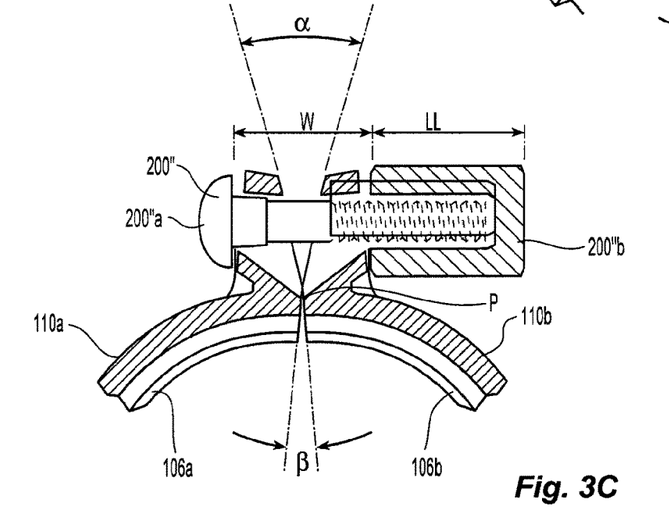

Shown in FIGS. 3B and 3C are alternate embodiments of the gap setting bolt assembly 200. In FIG. 3B a gap setting bolt assembly 200' includes a shank portion 200'a and nut portion 200'b. The nut portion 200'b includes a first fixed nut 210a and an adjustable nut 210b in which the fixed nut 210a is fixed along the shank portion 200'a so as to set the width W and limit the threaded engagement of the adjustable nut 210b. Shown in FIG. 3C is another embodiment of a gap setting bolt assembly 200" in which the nut portion 200"b includes a cap or closed end nut which defines an internal thread of limited length LL. The closed end of the nut limits the threaded engagement between the nut cap and the shank portion 200"a so as to define the desired gap W in the preassembled coupling 100.

Figure 5A:
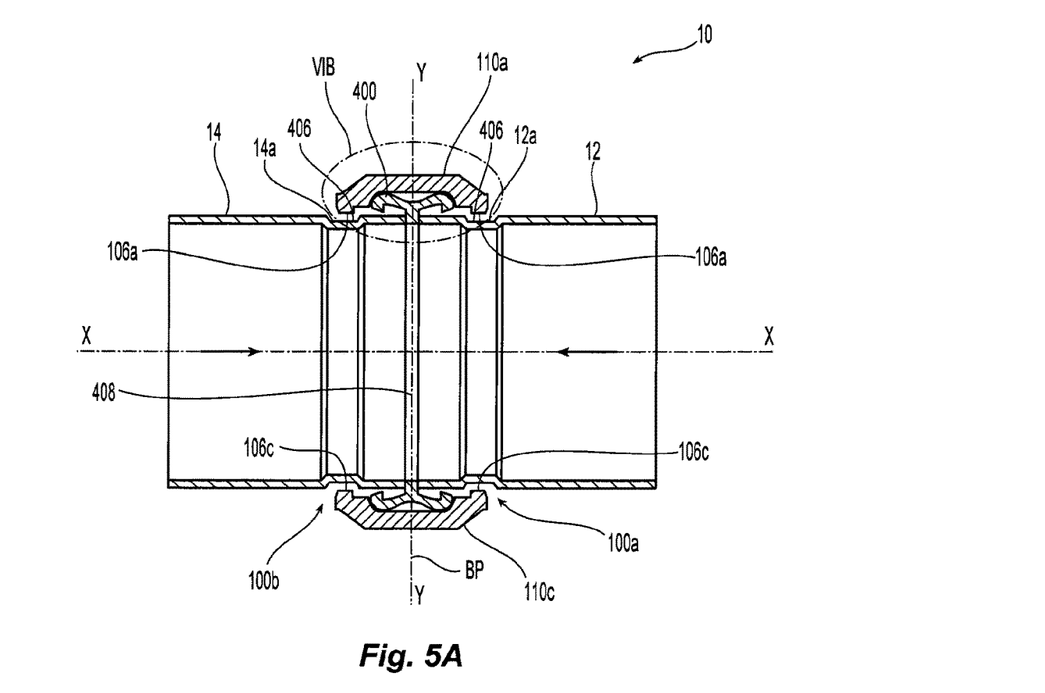
FIG. 5A is a cross-sectional view of the preferred pipe joint of assembly of FIG. 1A along line VA-VA.
Figure 5B:
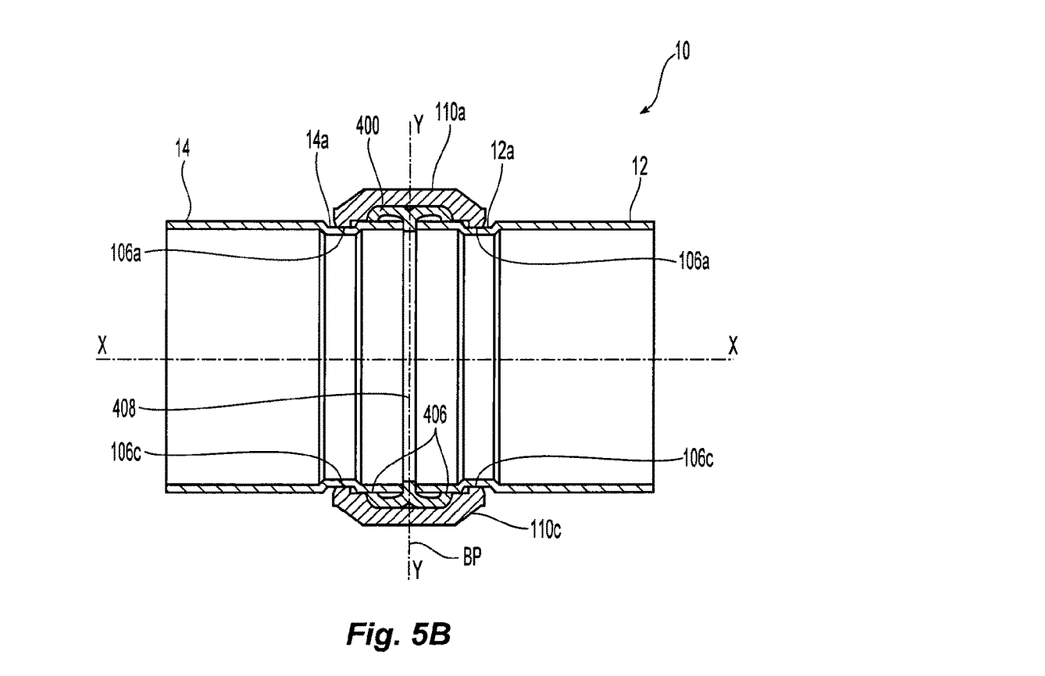
FIG. 5B is a cross-sectional view of the preferred pipe joint of assembly of FIG. 1B along line VB-VB.
Figure 7A:
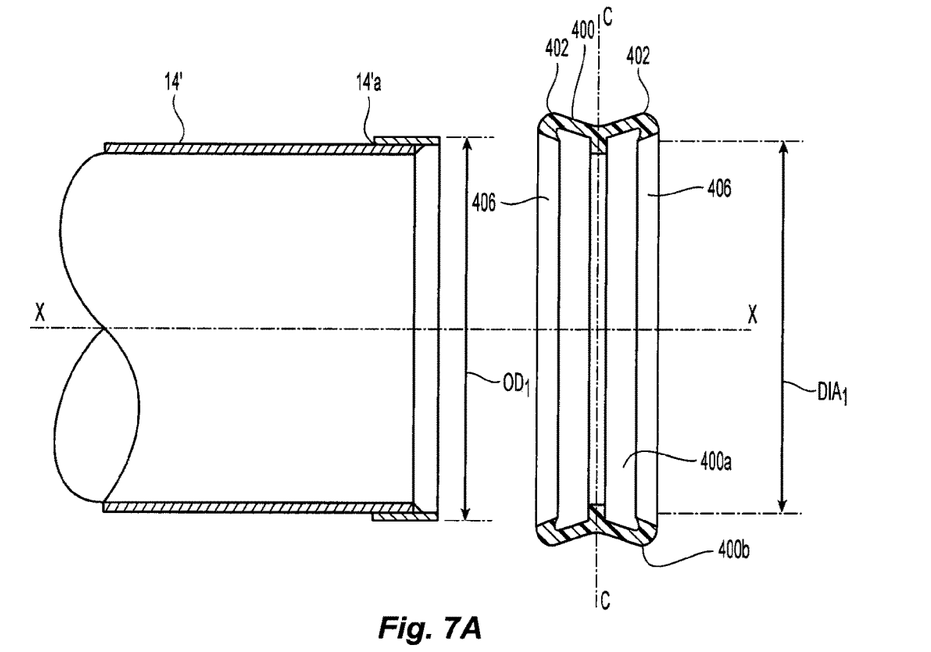
FIG. 7A is an exploded cross-sectional view of another pipe segment and the gasket of FIG. 5A for use in the pipe joint of FIG. 1A.
Figure 7B:
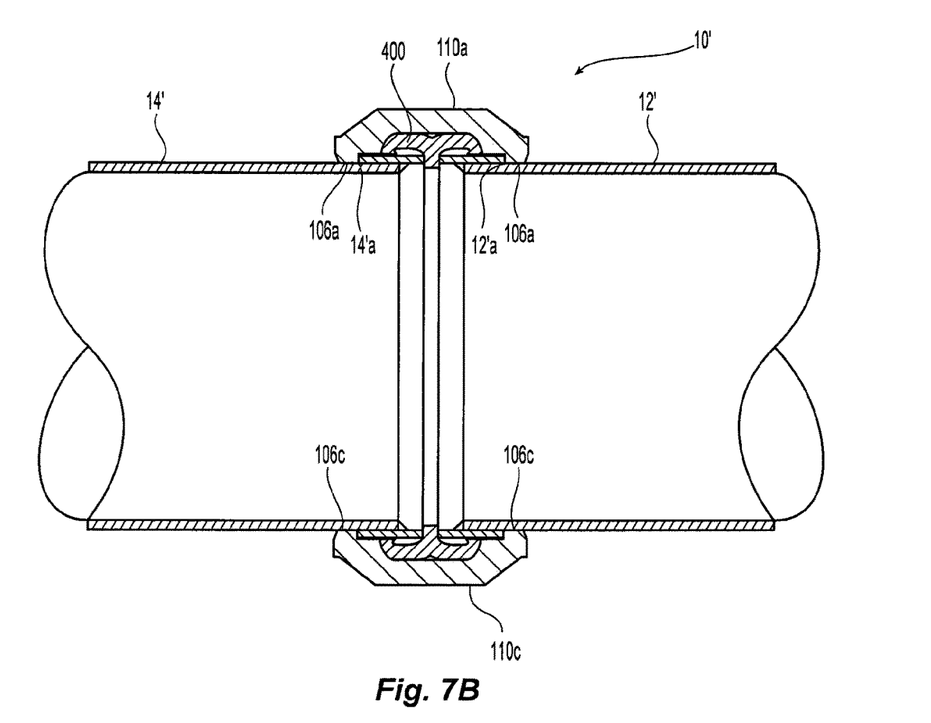
FIG. 7B is a cross-sectional view of another embodiment of the pipe joint of assembly using the coupling of FIG. 3A.

Shown in FIGS. 5A and 5B is the formation of pipe joint 10 defining the central joint axis X-X using the preferred preassembled coupling 100. The preferred coupling 100 is preferably symmetrical about the axis Y-Y which defines a bisecting plane BP and bisects the coupling 100 perpendicular to the joint axis X-X. Shown particularly in FIG. 5A, is a cross-sectional view of the coupling 100 showing the first housing segment 110a and the third housing segment 110c in their open configuration. Inserted in each receiving end 100a, 100b is a pipe segment 12, 14 for formation of the preferred joint. The coupling 100 extends across the end-to-end pipe junction so that the arcuate surfaces 106a, 106c at each receiving end 100a, 100b is aligned with the circumferential grooves 12a, 14a of the pipe segments 12, 14. As shown, the open configuration of the preassembled coupling 100 provides sufficient clearance for insertion of the pipe segments 12, 14; and more particularly, provides a housing for a pipe joint gasket 400 and insertion of the pipe joint segments 12, 14. Shown in FIG. 5B is the coupling 100 in its preferred closed configuration with the arcuate surfaces 106a, 106c engaged with the circumferential grooves 12a, 14a of the pipe segments 12, 14. Moreover, the closed configuration of the preassembled coupling 100 collapses the interior surface of the housing segments 110a, 110b about the pipe segments 12, 14 such that the gasket 400 is compressed, as seen in FIG. 5B so as to form the sealed pipe joint. With reference to FIG. 7B, shown is an alternate pipe joint arrangement 10' in which the coupling 100 joins first and second shoulder pipe segments 12', 14'.

Figure 6A:
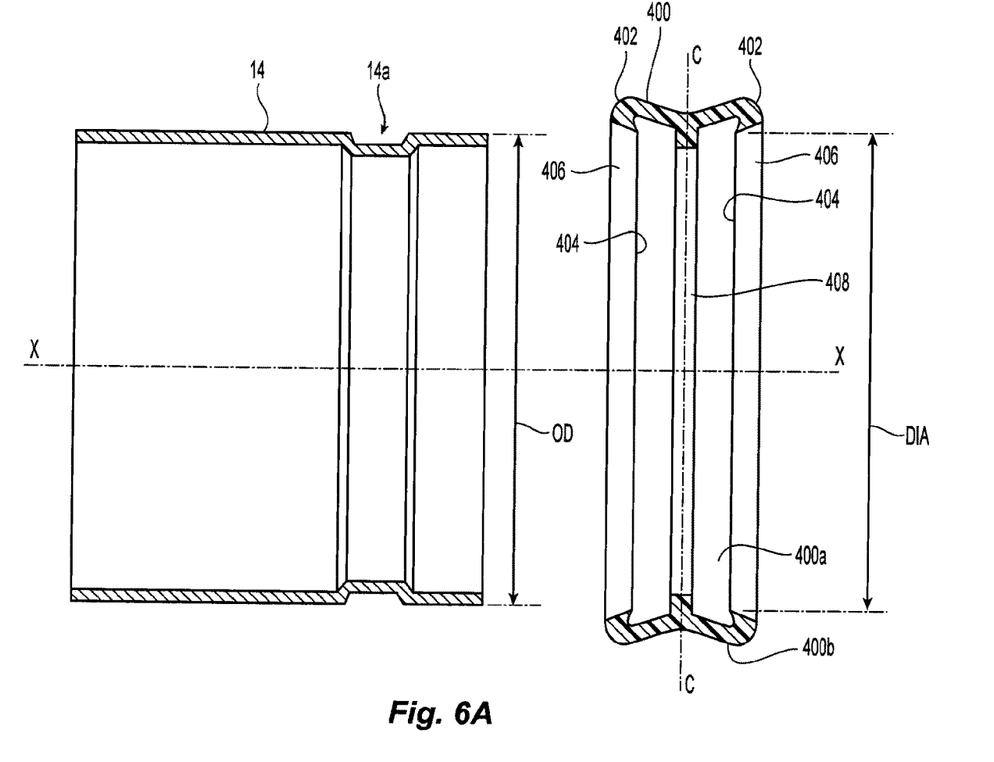
FIG. 6A is an exploded cross-sectional view of a pipe segment and gasket for use in the pipe joint of FIG. 1A.
Figure 6B:
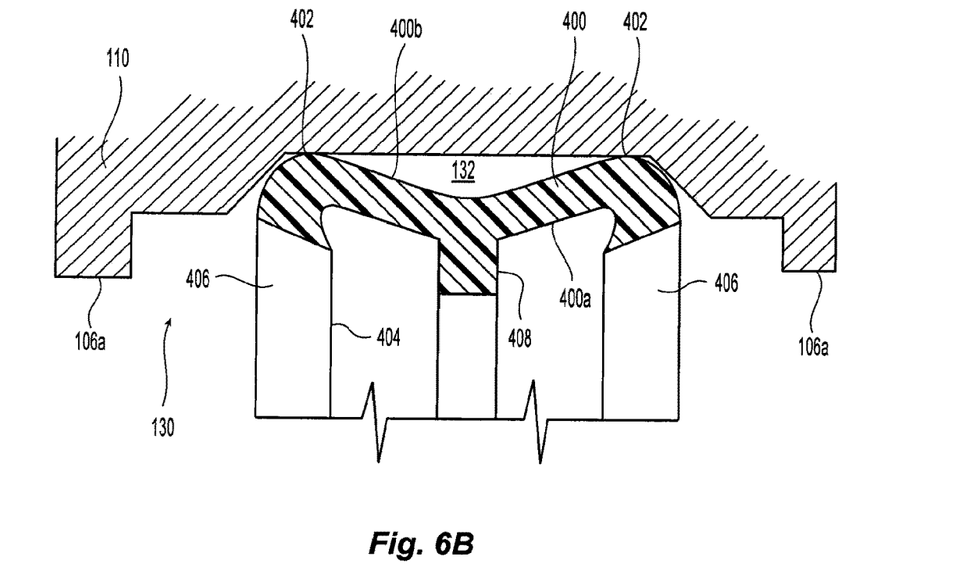
FIG. 6B is a detailed view of the cross-sectional of FIG. 5A included in the area VIB.

Referring now to FIG. 6A, shown is a cross-sectional view of a preferred gasket geometry for use in the preassembled coupling 100. The gasket 400 is preferably a continuous annular member defining a central axis for axial alignment with the joint axis X-X. The gasket 400 includes an inner surface 400a and an outer surface 400b. The gasket is preferably formed symmetrically about a bisecting axis C-C which extends substantially perpendicularly to the joint axis X-X and parallel to the joint bisecting axis Y-Y (shown in FIG. 5A). The inner surface preferably includes a pair of sealing lips or members 406 disposed about the bisecting axis C-C providing a surface for sealing engagement with the outer surface of the pipe segments 12, 14 in the closed configuration of the assembly 100 as seen for example in FIG. 5B. Referring again to FIG. 6A, the sealing lips 406 are preferably angled or tapered inwardly toward the central axis C-C so as to terminate at an interior edge or tip 404 and present a frustroconical surface defining an internal diameter DIA. Referring to FIGS. 5A and 6B, the preferred open configuration of the coupling 100 supports the gasket 400 for receipt of pipe segments 12, 14. Accordingly in the open configuration of the coupling 100 the internal diameter DIA is preferably greater than the maximum outer diameter OD of the pipe segments 12, 14, as seen in FIG. 6A or the outer diameter OD' of an alternatively configured pipe, such as for example, shoulder pipe segments 12', 14' as seen in FIG. 7A.

Additionally or further in the alternative, the gasket member 400 can provide a resistance support for separating the pipe engagement surfaces 106 of the coupling 100 for receipt of the pipe segments 12, 14. Referring again to FIG. 5A, the gasket member 400 is a preferably resilient member having an uncompressed state in which the sealing lips 406 define a sufficiently large internal diameter DIA. for receipt of the pipe segments. In a preferred aspect of the uncompressed configuration of the gasket 400, the gasket can have a sufficient resilience and/or the outer surface 400b can define a sufficiently large outer diameter of the gasket 400 to radially support the housing segments 110 such that their arcuate surfaces 106a, 106b (not shown, 106c) are spaced about the gasket 400 to permit insertion of the pipe segments 12, 14 into the interior space 108 of the preassembled coupling 100. Accordingly, the internal surface of the housing segments 110 preferably defines an internal cavity 130 between the pipe engagement surfaces 106 at cavity depth that engages the outer surface 400b of the gasket 400 such that the arcuate surfaces 106 of the housing segments in the preassembled coupling 100 are spaced apart from one another to allow for insertion of the pipe segments 12, 14 into the interior space of the coupling 100.

Preferably formed along the inner surface 400a of the gasket 400 and extending circumferentially is a central rib 408 aligned with the bisecting axis C-C. The central rib 408 extends radially toward the central axis X-X so as to provide buffer between the pipe segments 12, 14 when in their end-to-end relationship upon insertion into the preassembled coupling 100. In cross-section, the outer surface 400b defines a pair of shoulders 402 about the bisecting axis C-C. Preferably, the shoulders 402 define the maximum diameter of the gasket 400. Accordingly the diameter of the outer surface 400b preferably becomes smaller toward the bisecting axis Y-Y. When housed within the preassembled coupling 100, the gasket is disposed within the cavities 130 defined by each housing segment 110a, 110b, 110c and its internal surface. The outer surface 400b and the shoulders 402 of the gasket 400 preferably engage the interior surfaces of the housing segments 110a, 110b, 110c in the open configuration of the preassembled coupling 100 so as to define a void 132 between the interior surface and the outer surface 400b of the gasket 400 as seen in FIG. 6B. Moreover, the interior surface of the housing segments 110a, 110b, 110c preferably define a cavity depth so that in the closed configuration of the preassembled coupling 100, the gasket is compressed such that the sealing lips 406 fully engage the outer surface of the pipe segments to form a fluid tight seal as seen for example in FIG. 5B. Alternate internal housing (cavity) and gasket geometries or arrangements are shown in U.S. Patent Application Publication No. 2012/0256418 and U.S. Patent Application Publication No. 2012/0248767.

The preferred coupling 100 provides for a preassembly in which pipe segments 12, 14 can be inserted into the preassembly or alternatively the coupling 100 can be disposed over an end of the pipe segments 12, 14 as a preassembly. For the preferred open configuration of the coupling 100, each of the interior arcuate surfaces 106 are spaced from the central axis X-X, and the sealing lips 406 each define a minimum internal diameter DIA. to permit insertion or receipt of the pipe segments 12, 14 as shown in FIGS. 5A and 6A. More specifically, in the open configuration, each of the three housing segments are spaced radially from the central axis at a greater distance than the radial distance defined between the gasket sealing lip tip 404 and the central axis so as to allow for insertion of pipe segments 12, 14 into the assembly and form the end-to-end relationship of the pipe joint. However, the closed configuration spaces the housing segments 110 about the pipe segments 12, 14 so as to engage the outer surface of the pipe segments 12, 14 and more preferably compress the internal gasket 400 to form a fluid tight seal about the joint 10. Again, the pipe engagement surfaces 106 are configured such that there is no deformation in the piping or housing segments in the transition from the first to the second state or configuration of the coupling 100.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope defined by the language of the following claims, and equivalents thereof.

What is claimed is:

1. A preassembled pipe coupling, comprising:
a first housing segment having a first pipe engagement surface having a first radius of curvature from a first center of curvature and a first outer housing surface opposite the first pipe engagement surface, the first housing segment having a first pair of end pads with the first engagement surface and the first outer housing surface disposed between the first pair of end pads;
a second housing segment having a second pipe engagement surface having a second radius of curvature from a second center of curvature and a second outer housing surface opposite the first pipe engagement surface, the second housing segment having a second pair of end pads with the second engagement surface and the second outer housing surface disposed between the second pair of end pads;
a third housing segment having a third pipe engagement surface having a third radius of curvature from a third center of curvature, the third housing segment having a third pair of end pads with the third engagement surface disposed between the third pair of end pads, the first, second and third radii being identical;
a first bolt assembly defining a first bolt axis, the first bolt assembly coupling one end pad of the first housing segment to one end pad of the second housing segment to define a pivot point about which the first and second pipe engagement surfaces pivot with respect to one another, the end pad of the first housing segment defining a first contact surface, the end pad of the second housing segment defining a second contact surface, the first contact surface and second contact surface contact to define the pivot point, the pivot point being located within an outer circumferential bound of the first outer housing surface and the second outer housing surface and along the contact surfaces so as to define an outside radial angle and an inside radial angle about the pivot point over which the first and second engagement surfaces pivot with respect to one another, a vertex of the outside radial angle coincides with a vertex of the inside radial angle at the pivot point, wherein in a first configuration the outside radial angle is minimized and the inside radial angle is maximized and in a second configuration, the outside radial angle is maximized and the inside radial angle is minimized;
an annular gasket member defining a central axis; and
a second bolt assembly and a third bolt assembly for locating the first, second and third pipe engagement surfaces about the gasket member in the first configuration to define an interior space of the coupling for inserting a pipe segment, the second and third bolt assemblies locating the first, second, and third pipe engagement surfaces in the second configuration about the gasket member such that the first, second and third pipe engagement surfaces engage the outer surface of the pipe segment and compress the gasket member about the outer surface to form a fluid tight seal, the second bolt assembly defining a second bolt axis and the third bolt assembly defining a third bolt axis, the second bolt assembly joining the other end pad of the first housing segment to one end pad of the third housing segment, the third bolt assembly joining the other end pad of the second housing segment to the other end pad of the third housing segment, the second and third bolt assemblies being oriented with respect to one another such that the second and third bolt axes each define an acute included angle between the second and third bolt axes,
wherein in the first configuration the first, second, and third centers of curvature are spaced apart, and in the second configuration the first, second and third centers of curvature are coaxially aligned, the first, second and third radii being the same in each of the first and second configurations, wherein the inside radial angle is not formed via deformation of the first housing segment, the second housing segment, and the third housing segment.

2. The preassembled pipe coupling of claim 1, wherein the acute angle between the second and third bolt axes is sixty degrees.

3. The preassembled pipe coupling of claim 1, wherein the second and third bolt assemblies each include a bolt and a nut, the bolt having a bolt head with a threaded shank with the nut disposed on the threaded shank, wherein in the second configuration, the first bolt axis extends parallel to a plane passing through the aligned first, second and third centers of curvature, the second and third bolt assemblies being disposed to one side of the plane opposite the first bolt assembly, the bolt heads of the second and third bolt assemblies being disposed between the plane and the nuts of the second and third bolt assemblies.

4. The preassembled pipe coupling of claim 1, wherein the first bolt assembly includes a shank and a nut, the shank having an upper portion including a bolt head and a lower threaded portion with the nut being disposed on the lower threaded portion, each end pad including a through bore, the shank extending through the through bores of each end pad joined by the first bolt assembly such that their contact surfaces contact to define the pivot point.

5. The preassembled pipe coupling of claim 1, wherein the pipe segment includes a circumferential groove, the first, second and third pipe engagement surfaces engage the circumferential groove in the second configuration of the coupling, the circumferential groove defining an outer diameter of the pipe segment that is the same in each of the first and second configurations.

6. The preassembled pipe coupling of claim 1, wherein the annular gasket member includes a sealing lip, wherein in the first configuration the sealing lip extends circumferentially about the central axis to define an internal diameter of the gasket that is greater than an outer diameter of the pipe segment.

7. A preassembled pipe coupling comprising:
a housing having three identical housing segments, each segment having a pair of end pads with an arcuate segment disposed between the end pads, the arcuate segment including a pair of pipe engagement surfaces extending parallel to one another from one end pad to the other end pad, the housing segment including an inner surface defining a cavity between the pipe engagement surfaces for housing a portion of an annular pipe gasket and an outer surface opposite the inner surface of the housing segment, the gasket having an inner surface including a sealing lip circumscribed about a central axis to define an internal diameter of the gasket, each pipe engagement surface having a radius of curvature from a center of curvature, the radii of curvature of the three housing segments being identical, the three housing segments being interconnected end pad-to-end pad to house the pipe gasket, with a first housing segment and a second housing segment forming a pivot connection therebetween, the third housing segment being connected to the first and second housing segments to define a first configuration and a second configuration of the coupling, the radii of curvature being the same in the first and second configurations,
a first end pad of a first housing segment of the three identical housing segments defining a first contact surface, a second end pad of a second housing segment of the three identical housing segments defining a second contact surface, the first contact surface and the second contact surface contact to define a pivot point about which the first housing segment and second housing segment pivot with respect to one another, the pivot point being located within an outer circumferential bound of the outer surfaces of the first housing segment and the second housing segment and along the first contact surface and the second contact surface so as to define an outside radial angle and an inside radial angle about the pivot point over which the first housing segment and the second housing segment pivot with respect to one another, a vertex of the outside radial angle coincides with a vertex of the inside radial angle at the pivot point;
wherein in the first configuration, the three housing segments are radially located about the annular gasket such that the inner diameter of the gasket is greater than an outer diameter of a pipe segment with the pipe engagement surfaces being located about the central axis to permit insertion of the pipe segment into the gasket, the outside radial angle is minimized, and the inside radial angle is maximized; and
wherein in the second configuration, the three housing segments are radially located about the annular gasket such that the gasket is compressed and the sealing lip engages a portion of the outer surface of the pipe to form a fluid tight seal, the pipe engagement surfaces being located about the central axis so as to engage another portion of the outer surface of the pipe segment, the outer diameter of the pipe segment in the second configuration being the same as the outer diameter of the pipe in the first configuration, the outside radial angle is maximized, and the inside radial angle is minimized, wherein the inside radial angle is not formed via deformation of the first housing segment, the second housing segment, and the third housing segment.

8. The preassembled pipe coupling of claim 7, further comprising a pair of bolt assemblies to locate the third housing segment with respect to the first and second housing segments, each bolt assembly defining a bolt axis, wherein the pair of bolt assemblies are oriented with respect to one another such that their axes define an acute included angle.

9. The preassembled pipe coupling of claim 8, wherein the acute angle is sixty degrees.

10. The preassembled pipe coupling of claim 8, wherein the pair of bolt assemblies each include a bolt and a nut, the bolt having a bolt head with a threaded shank with the nut disposed on the threaded shank, wherein in the second configuration, the first bolt axis extends parallel to a plane passing through the centers of curvature, the second and third bolt assemblies being disposed below the plane, the bolt heads of the bolt assemblies being disposed between the plane and the nuts of the second and third bolt assemblies.

11. The coupling assembly of claim 7, further comprising a gap setting bolt assembly coupling the first housing segment to the second housing segment, the gap setting bolt assembly including a shank and nut, the shank having an upper portion including a bolt head and a lower threaded portion with the nut being disposed on the lower threaded portion, the gap setting bolt assembly defining the angular range over which the first and second housing segments pivot with respect to one another.

12. The preassembled pipe coupling of claim 7, wherein the pipe segment includes a circumferential groove, the pipe engagement surfaces being engaged with the circumferential groove in the second configuration.

* * * * *